United States Patent
Gotoh

(10) Patent No.: US 6,864,612 B1
(45) Date of Patent: Mar. 8, 2005

(54) IRON CORE FOR ELECTRIC MOTOR AND ELECTRIC GENERATOR

(76) Inventor: Kazuhiko Gotoh, 28-204 Wakabacho Danchi, 25-1, Wakabacho 4-chome, Tachikawa-shi, Tokyo (JP)

( * ) Notice: Subject to any disclaimer, the term of this patent is extended or adjusted under 35 U.S.C. 154(b) by 0 days.

(21) Appl. No.: 10/795,266

(22) Filed: Mar. 9, 2004

(51) Int. Cl.$^7$ ................................. H02K 17/10
(52) U.S. Cl. ........................ 310/172; 310/187
(58) Field of Search ................... 310/172, 187, 310/216, 157, 185, 186, 188

(56) References Cited

U.S. PATENT DOCUMENTS

| | | | | |
|---|---|---|---|---|
| 2,467,754 A | * | 4/1949 | Koch | 310/172 |
| 2,511,698 A | * | 6/1950 | Dickey | 318/695 |
| 2,946,941 A | * | 7/1960 | Jin | 318/776 |
| 3,154,708 A | * | 10/1964 | Shaffer | 310/187 |
| 3,158,769 A | * | 11/1964 | Morrill | 310/172 |
| 3,697,842 A | * | 10/1972 | Morrill | 318/781 |
| 4,346,335 A | * | 8/1982 | McInnis | 388/803 |
| 5,036,237 A | * | 7/1991 | London | 310/172 |

* cited by examiner

Primary Examiner—Dang Le
(74) Attorney, Agent, or Firm—Manabu Kanesaka

(57) ABSTRACT

An iron core for an electric motor or an electric generator includes a core section, and at least two magnetic pole pieces formed at the core section. Each magnetic pole piece has at least two slits with difference depths extending from a surface thereof to be asymmetric with respect to a center line thereof so as to divide the magnetic pole surface.

7 Claims, 12 Drawing Sheets

IRON CORE FOR ELECTRIC MOTOR AND ELECTRIC GENERATOR

BACKGROUND OF THE INVENTION AND RELATED ART STATEMENT

The present invention relates to a structure or shape of an iron core in a rotating instrument for an electric motor, an electric generator and the like. More specifically, the invention relates to a technique for a rotating instrument having high performance at a low cost, wherein, while holding high efficiency of the rotating instrument which has been made highly efficient in late years, cogging torque of a rotor in the rotating instrument is reduced to generate a stable rotating torque and improve rotating characteristics.

As is generally known, in a conventional rotating instrument, such as an electric motor and an electric generator, there has been proposed a number of techniques for improving rotating characteristics by reducing cogging torque of a rotor to generate a stable rotating torque.

More specifically, there have been attained rotating characteristics (torque characteristics) in practical use in a conventional rotating instrument by reducing the cogging torque with multiple magnetic poles in an iron core, or with different numbers of the stator poles and the rotor poles, i.e. with the stator of twelve poles and the rotor of four poles.

The rotating instruments as described above are considered to be further improved in the following points.

In detail, in the conventional rotating instrument having high efficiency, in order to improve the rotating torque characteristics by reducing the cogging torque, it has only been proposed that an electric motor or an electric generator has multiple magnetic poles in a stator or a rotor, resulting in a costly structure with an intricately wound-wire.

Also, in the conventional technique, to attain the rotating instrument having the reduced cogging torque, the pole number of the stator and the pole number of the rotor are made different. For example, the cogging torque problem has been solved by allowing the stator to have twelve poles and the rotor to have four poles. Thus, a rotating instrument having a small pole number, such as three pole stator and two pole rotor, has not been proposed due to the strong cogging torque. Also, it has been difficult in the conventional art that a rotating instrument having the stator and the rotor with the same pole number is used since such a rotating instrument generates structurally a strong caulking torque.

In view of the above, an object of the invention is to provide a rotating instrument having high efficiency and high power, wherein in the rotating instrument requiring high efficiency and high power, the cogging torque can be reduced even in a rotating instrument with the small number of poles, and even in a combination of a stator and a rotor having the same pole number, which have been difficult in the conventional art.

Further objects and advantages of the invention will be apparent from the following description of the invention.

SUMMARY OF THE INVENTION

In order to solve the above problems, the present invention provides the following techniques. That is, for an iron core of an electric motor or an electric generator having two or more magnetic pole pieces, there can be provided an iron core, wherein two or more slits with different depths are provided on a magnetic pole surface to be left-right asymmetric with respect to a center line of the magnetic pole piece so as to divide the magnetic pole surface.

Also, for an iron core of an electric motor or an electric generator having two or more magnetic pole pieces, there can be provided an iron core having magnetic pole pieces, wherein half of a total number of the magnetic pole pieces of the iron core has one type of slits, and the remaining half has another type of slits in a symmetric shape with respect to the one type of the slits.

DETAILED DESCRIPTION OF PREFERRED EMBODIMENTS

Embodiments according to the invention will be described with reference to the accompanying drawings.

FIGS. 1(a) through 2(b) show a first embodiment. More specifically, for an iron core with magnetic pole pieces of an electric motor, electric generator or the like, there is provided an iron core 1 having a plurality of magnetic pole pieces 3a. Each magnetic pole piece 3a includes two or more slits 2a with different depths provided so as to be left-right asymmetric with respect to a center line of the magnetic pole piece to thereby divide a magnetic pole surface.

Figure 1A:
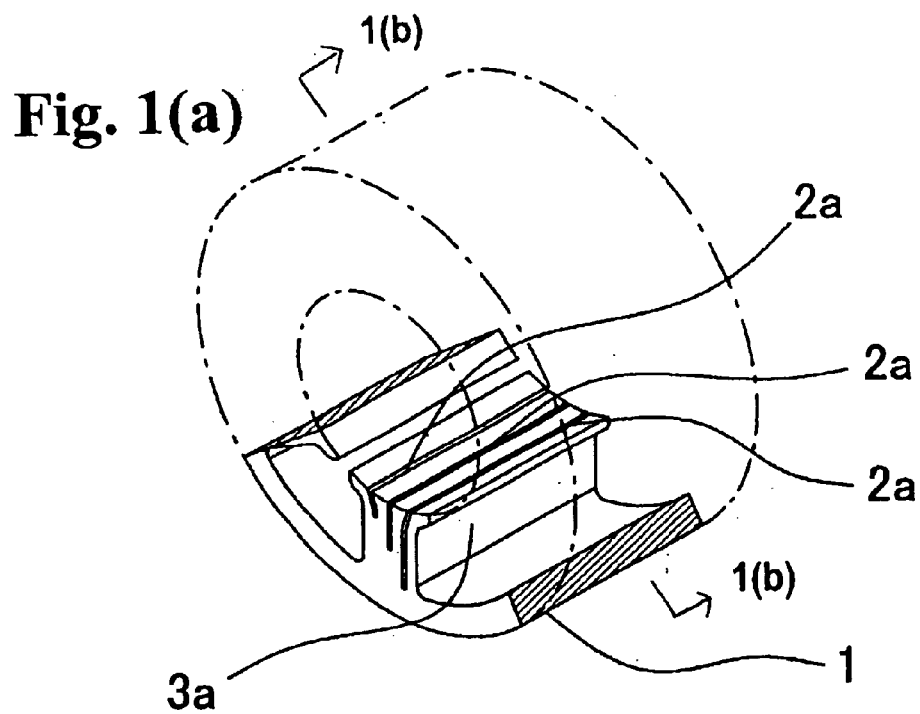
FIG. 1(a) is a perspective view of a straight groove type magnetic pole piece according to the invention.
Figure 1B:
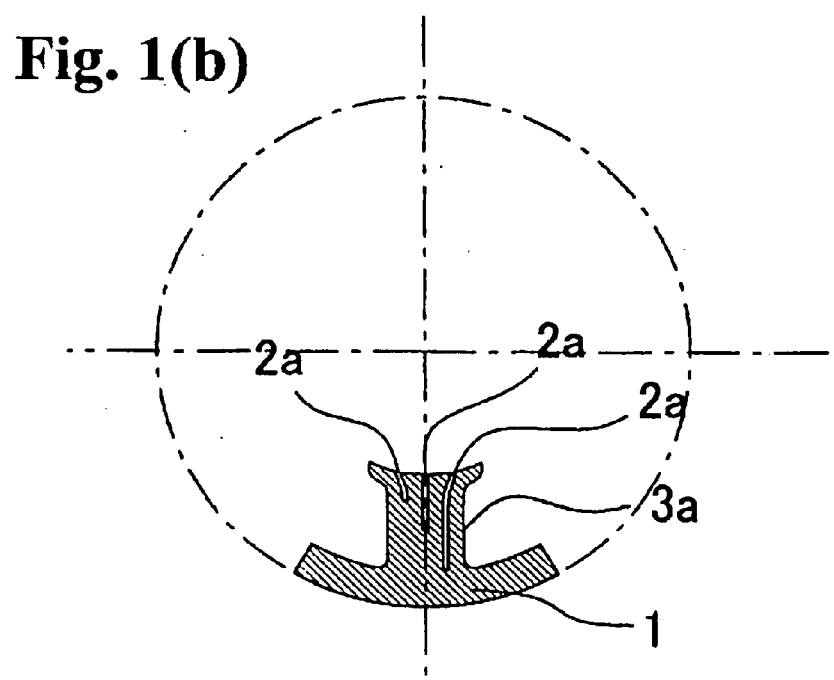
FIG. 1(b) is a sectional view taken along line 1(b)—1(b) in FIG. 1(a)
Figure 2A:
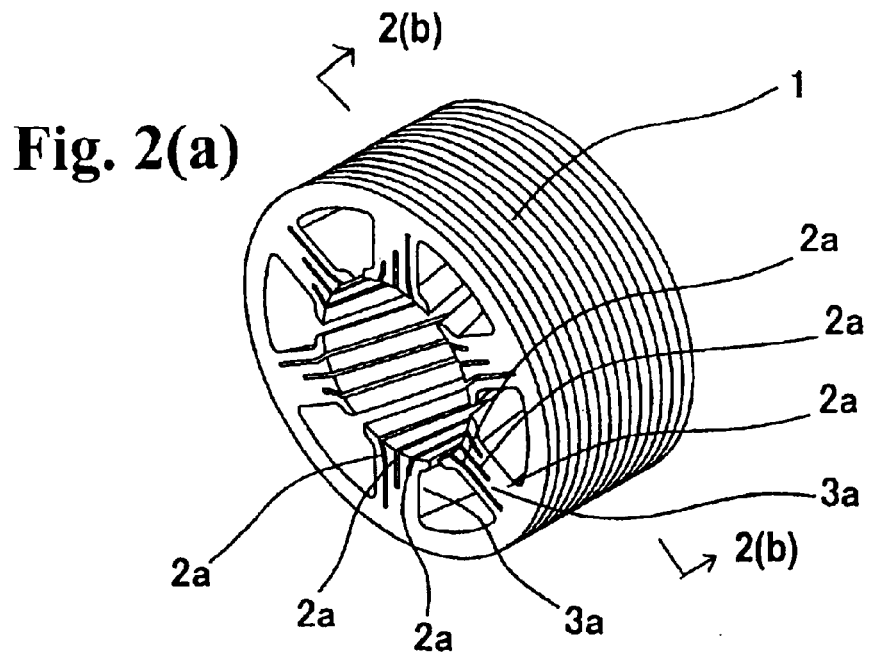
FIG. 2(a) is a perspective view of a slant groove type iron core according to the invention.
Figure 2B:
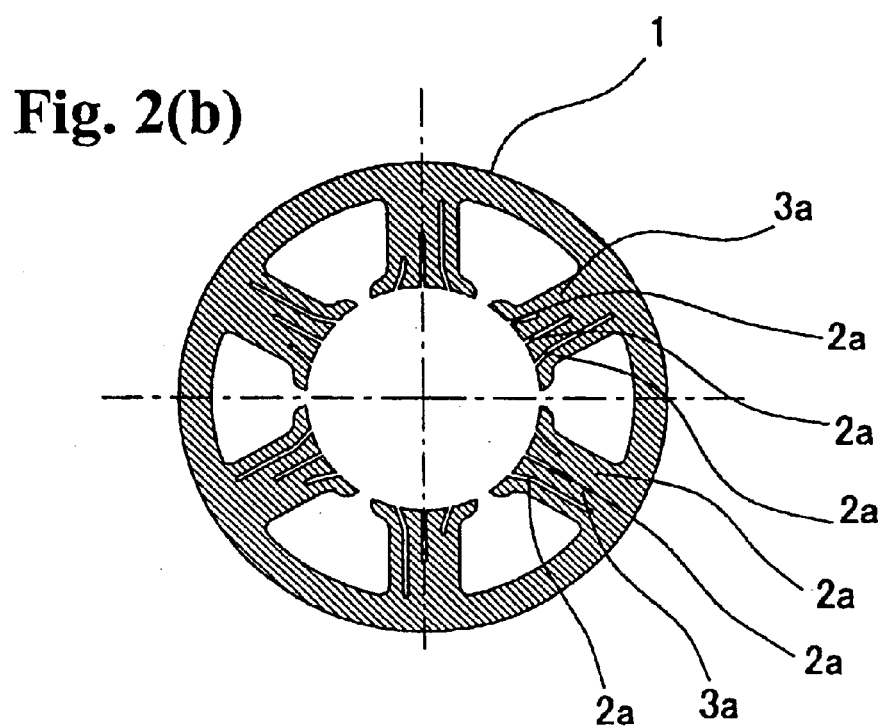
FIG. 2(b) is a sectional view taken along line 2(b)—2(b) in FIG. 2(a)
Figure 3A:
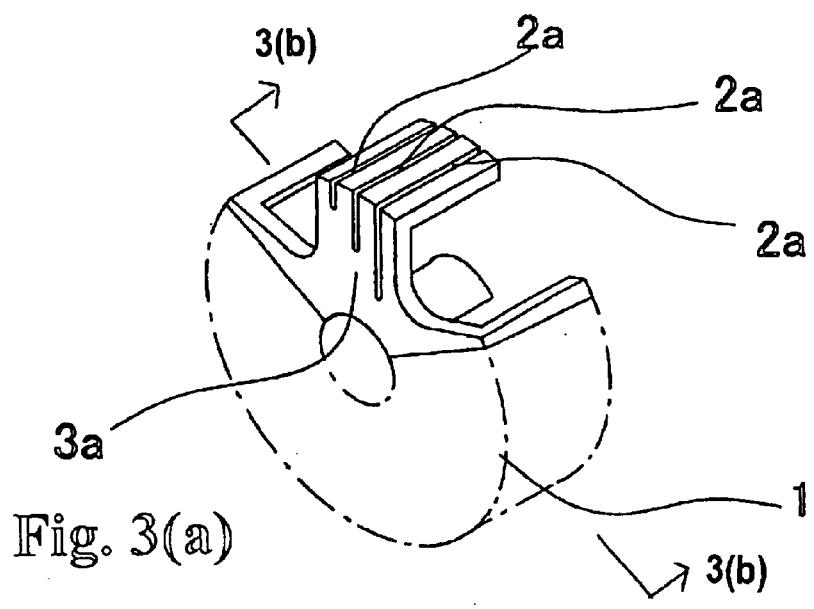
FIG. 3(a) is a perspective view of a claw pole type straight groove magnetic pole piece.
Figure 3B:
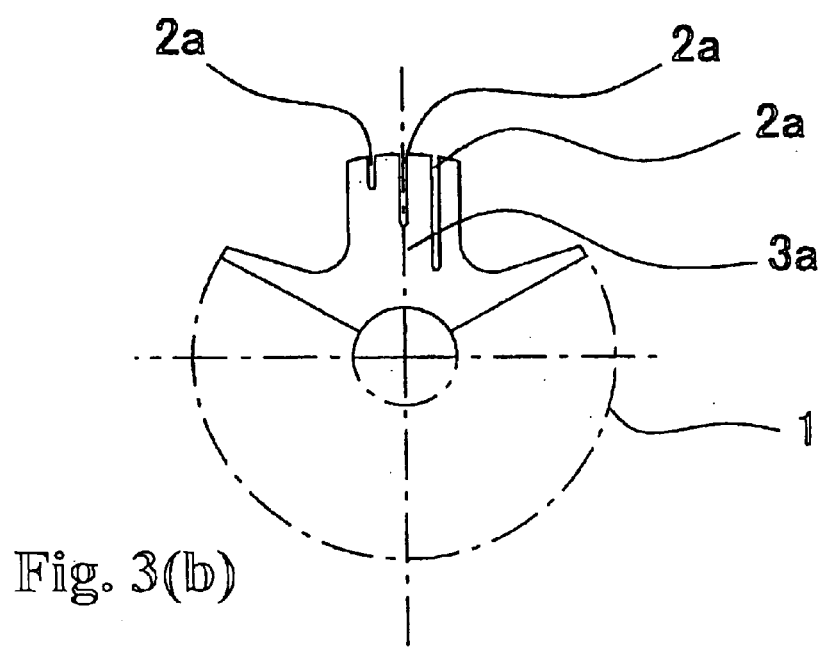
FIG. 3(b) is a side view taken along line 3(b)—3(b) in FIG. 3(a)

FIGS. 3(a) and 3(b) show another example of a claw pole type iron core in the first embodiment. More specifically, for an iron core with straight groove type magnetic pole pieces of an electric motor, electric generator or the like, there is provided an iron core 1 having a plurality of straight groove type magnetic pole pieces 3a. Each straight groove type magnetic pole piece 3a includes two or more slits 2a with different depths so as to be left-right asymmetric with respect to the center line of the magnetic pole piece to thereby divide the magnetic pole surface.

Figure 4A:
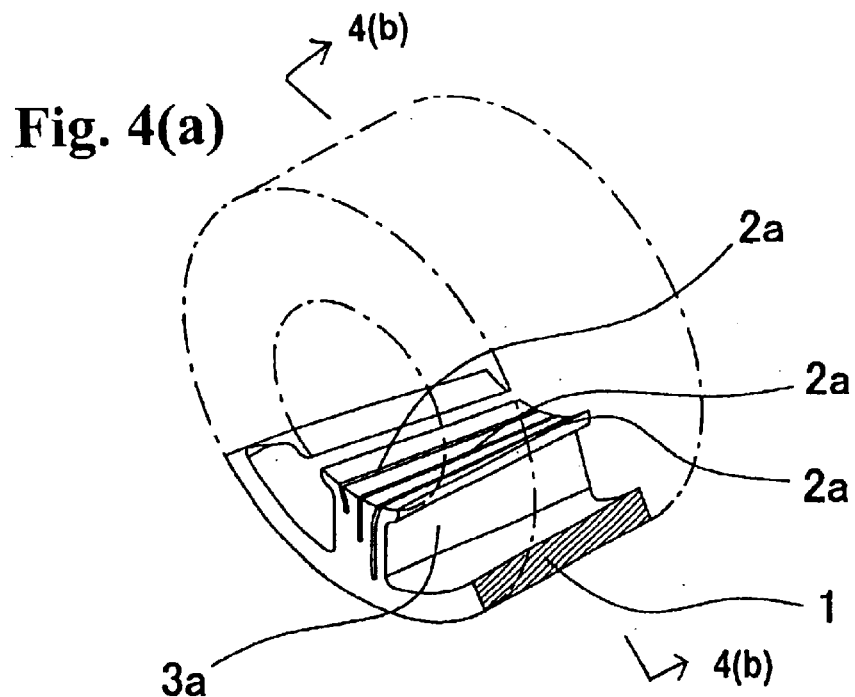
FIG. 4(a) is a perspective view of a slant groove type magnetic pole piece according to the present invention.
Figure 4B:
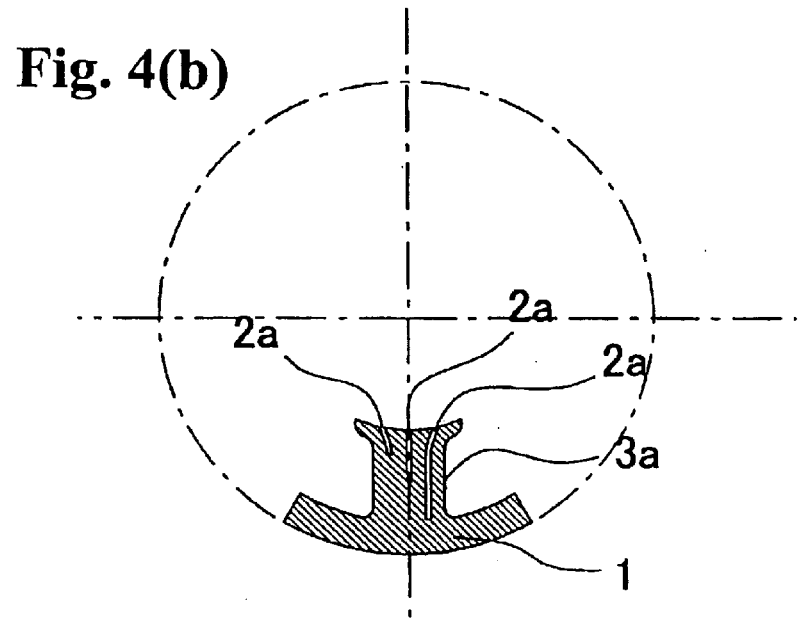
FIG. 4(b) is a sectional view taken along line 4(b)—4(b) in FIG. 4(a)

FIGS. 4(a) and 4(b) show a further example of the first embodiment. More specifically, for an iron core with slant groove type magnetic pole pieces of an electric motor, electric generator or the like, there is provided an iron core 1 having a plurality of slant groove type magnetic pole pieces 3a. Each slant groove type magnetic pole piece 3a includes two or more slits 2a with different depths so as to be left-right asymmetric with respect to the center line of the magnetic pole piece to thereby divide the magnetic pole surface.

Figure 5A:
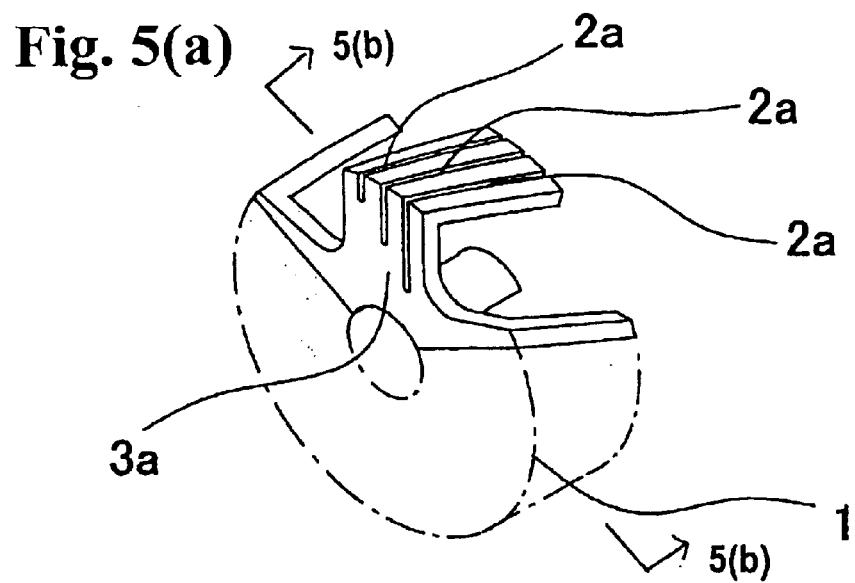
FIG. 5(a) is a perspective view of a claw pole type slant groove magnetic pole piece according to the present invention.
Figure 5B:
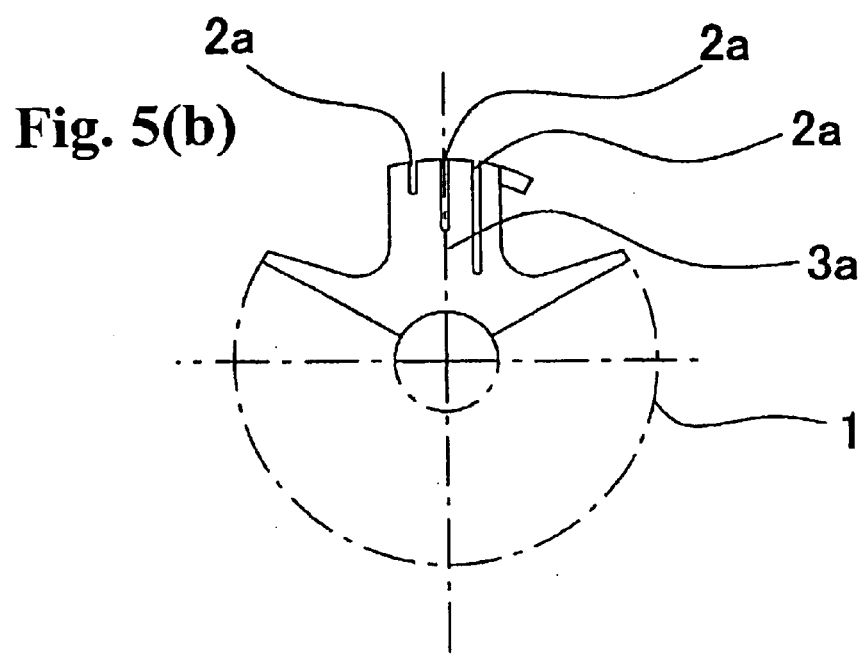
FIG. 5(b) is a side view taken along line 5(b)—5(b) in FIG. 5(a)

FIGS. 5(a) and 5(b) show a further example of the first embodiment. More specifically, for an iron core with slant groove type magnetic pole pieces of an electric motor, electric generator or the like, there is provided an iron core 1 having a plurality of slant groove type magnetic pole pieces 3a. Each slant groove type magnetic pole piece 3a includes two or more slits 2a with different depths so as to be left-right asymmetric with respect to the center line of the magnetic pole piece to thereby divide the magnetic pole surface.

Figure 6A:
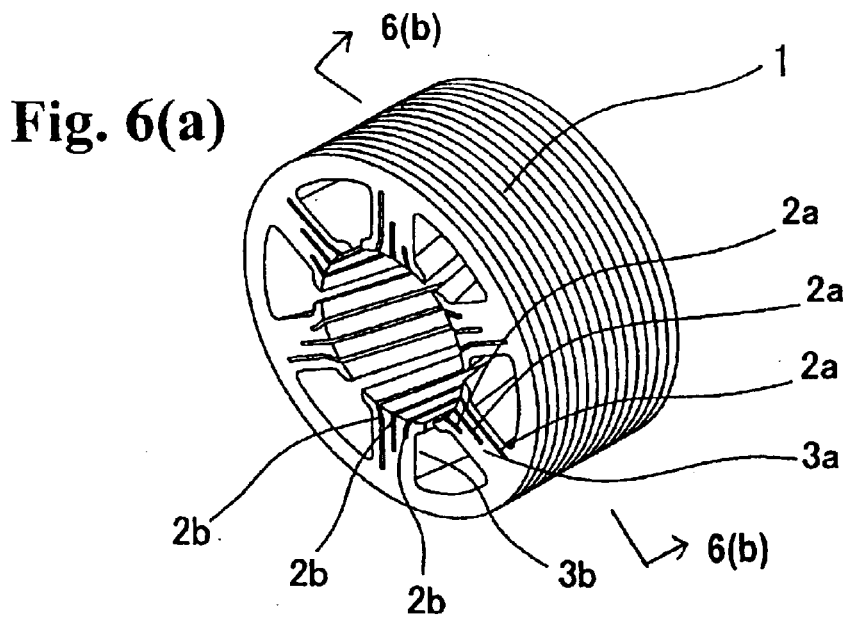
FIG. 6(a) is a perspective view of a slant groove type iron core according to the present invention.

FIG. 6(a) is a perspective view showing an example of an iron core 1 having a stator with six poles in a second embodiment. Specifically, for an iron core having two or more magnetic pole pieces, there is provided an iron core 1, wherein half of a total number of the magnetic pole pieces of the iron core 1 has slant groove type magnetic pole pieces 3a with slits 2a, and the remaining half has slant groove type magnetic pole pieces 3b with slits 2b. The slits 2a are formed in an asymmetric shape with respect to the slits 2b.

Figure 6B:
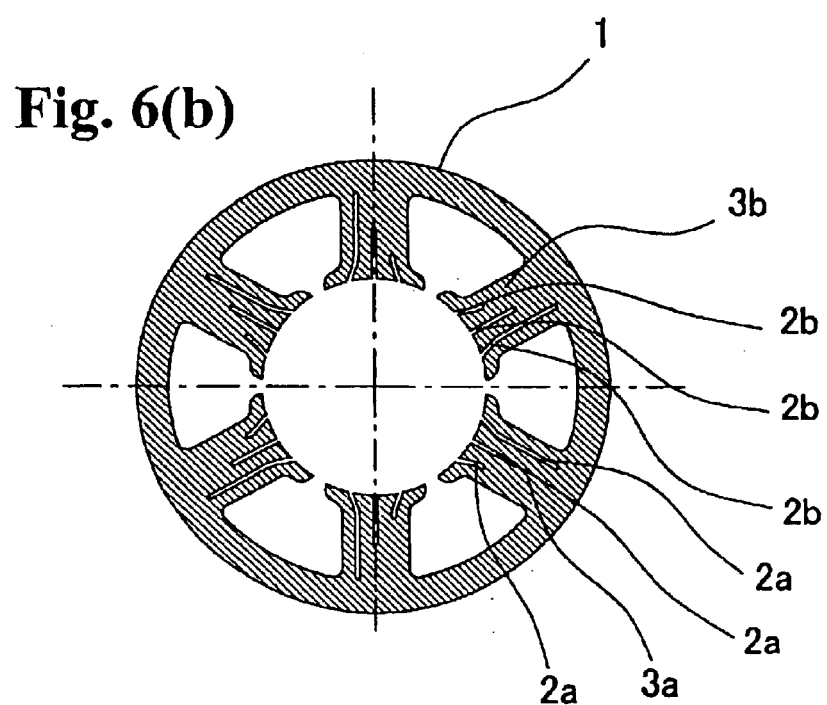
FIG. 6(b) is a sectional view taken along line 6(b)—6(b) in FIG. 6(a)

Therefore, in the embodiment shown in FIG. 6(b), an iron core 1 includes three poles formed of magnetic pole pieces 3a corresponding to the half of the total number of six poles of the magnetic pole pieces, and three poles formed of magnetic pole pieces 3b corresponding to the remaining half. These magnetic pole pieces 3a and 3b are disposed alternately to constitute the iron core 1.

Figure 7A:
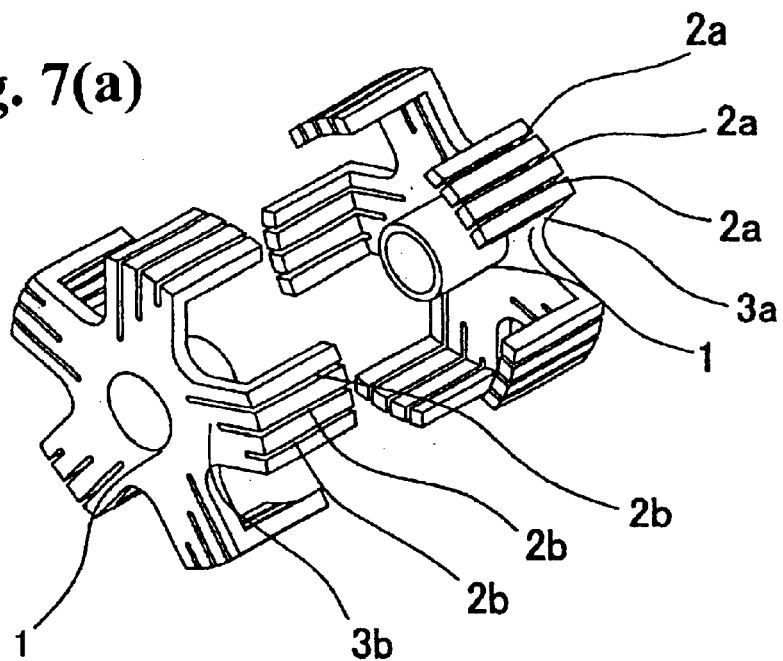
FIG. 7(a) is an exploded perspective view 6f a claw pole type straight groove iron core according to the present invention.

FIG. 7(a) is an exploded perspective view showing a structure of an iron core 1 of a claw pole type stator of the second embodiment. In FIG. 7(a), a coil is sandwiched between two iron cores 1 so that a magnetic circuit is formed. Thus, a stator coil can be easily manufactured.

In other words, for an iron core having two or more magnetic pole pieces, there is provided an iron core 1, wherein half of a total number of the magnetic pole pieces of the iron core 1 has straight groove type magnetic pole pieces 3a with slits 2a, and the remaining half has straight groove type magnetic pole pieces 3b with slits 2b. The slits 2a are arranged in an asymmetric shape with respect to the slits 2b.

Figure 7B:
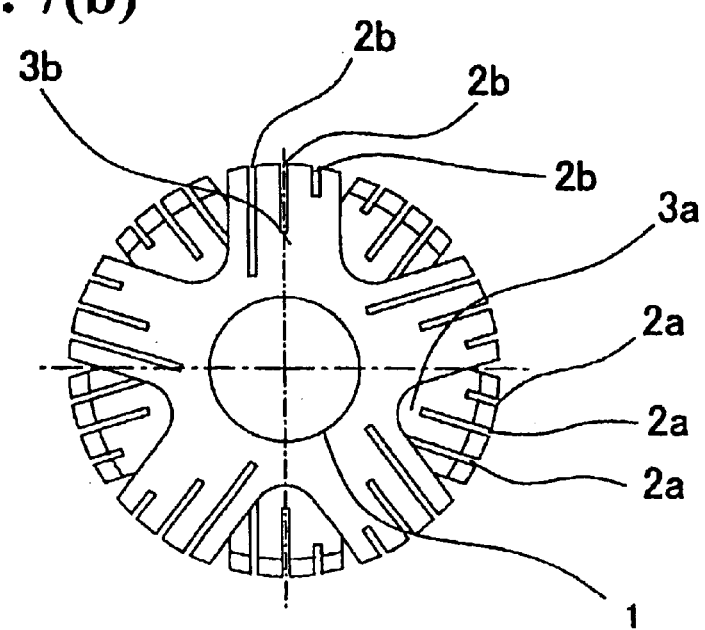
FIG. 7(b) is a side view thereof.

Therefore, in an embodiment shown in FIG. 7(b), an iron core 1 includes five poles formed of magnetic pole pieces 3a corresponding to the half of the total number of ten magnetic pole pieces, and five poles formed of magnetic pole pieces 3b corresponding to the remaining half. These magnetic pole pieces 3a and 3b are alternately disposed together to constitute the iron core 1.

In prior art, there has been a problem when the number of the stator poles and the number of the rotor poles are the same. However, in the embodiment of the iron core according to the invention, as shown in FIG. 8(a), there can be obtained changes in magnetic lines 8 and decrease effect in cogging torque by the slits 2a and 2b in case a rotor with six poles is provided in an example of a stator iron core 1 having six total number of magnetic pole pieces.

Figure 8A:
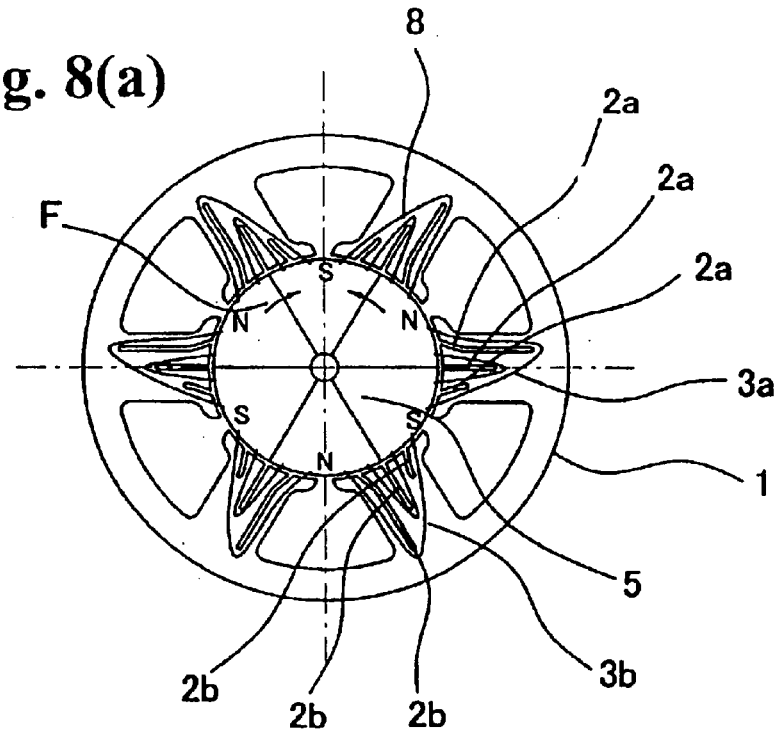
FIG. 8(a) is an explanatory drawing showing magnetic force lines of magnetic pole pieces according to the present invention.

More specifically, in the iron core 1 having six magnetic pole pieces according to the present invention, FIG. 8(a) shows the iron core 1 including three poles formed of magnetic pole pieces 3a with the slits 2a corresponding to the half of the total number of the magnetic pole pieces, and three poles formed of magnetic pole pieces 3b with the slits 2b corresponding to the remaining half. These magnetic pole pieces 3a and 3b are alternately disposed to constitute the iron core 1.

Next, with reference to FIG. 8(a), the change in the magnetic line 8 and a decrease effect in the cogging torque due to slits 2a, 2b will be explained. First, two or more slits 2a or 2b with difference depths are provided to the magnetic pole pieces 3a and 3b, respectively, so that each magnetic pole surface is divided into a plurality of surfaces to be left-right asymmetric with respect to the center line thereof. Thus, the length of a magnetic path through which the magnetic line 8 passes is extended when compared with a conventional iron core which does not have the slits, so that the attracting force applied to the rotor 5 by the magnetic force becomes small, resulting in a reduced cogging torque.

Figure 8B:
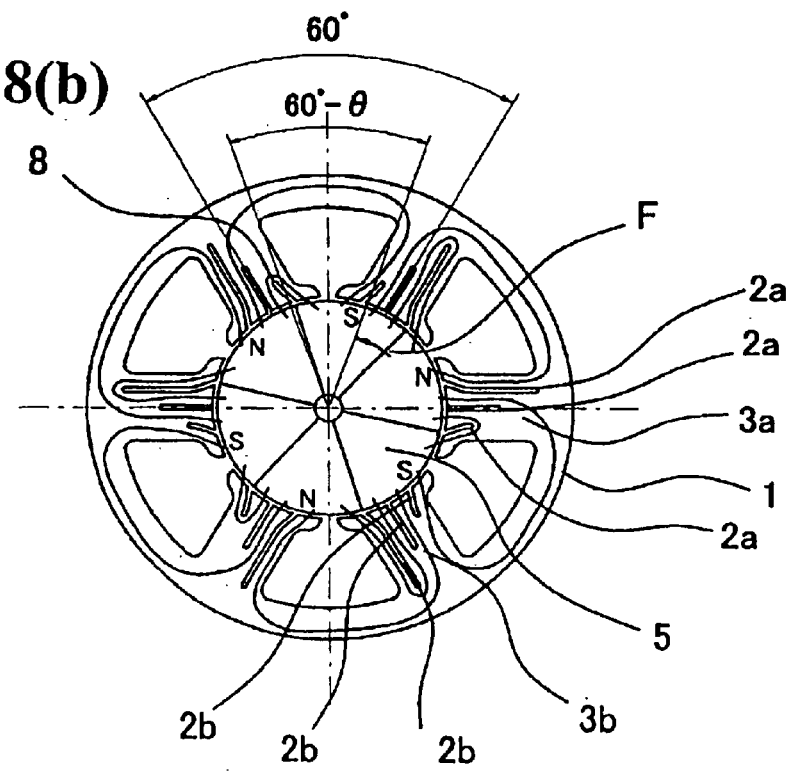
FIG. 8(b) is an explanatory drawing explaining decrease of cogging torque thereof.

Further, in FIG. 8(b), since each magnetic pole surface is divided into a plurality of the magnetic pole surfaces by providing two or more slits 2a or 2b with different depths, the attracting force applied to the rotor 5 becomes the maximum at a position of the shortest slit 2a or 2b in the magnetic pole piece 3a or 3b due to the shortest magnetic path. In other words, the boundary between the N pole and S pole of the rotor 5 is strongly attracted to the position of the shortest slit.

As a result, in FIG. 8(a), the boundary between the N pole and the S pole of the rotor 5, which generates a strong attracting force, is attracted to the positions of the shortest slits 2a, 2b to each other, so that the forces F are balanced to thereby move in either direction with a small force, resulting in a reduced cogging torque.

More specifically, in the present example, since the rotor 5 includes six poles, the boundaries between the N poles and the S poles are distributed every 60 degrees, and the disposition angle of the magnetic pole pieces 3a, 3b in the iron core 1 is also 60 degrees. However, since the magnetic pole surface is divided into plural surfaces by providing two or more slits 2a or 2b with different depths, the strong attracting force is generated at a position of the shortest slit 2a or 2b of the magnetic pole piece 3a or 3b, so that the center of the attracting force becomes 60 degrees or below, i.e. 60°-θ. Since the respective operation angles are different, actions for negating the mutual forces F are generated, and further, the effect for reducing the cogging torque is generated.

Figure 9:
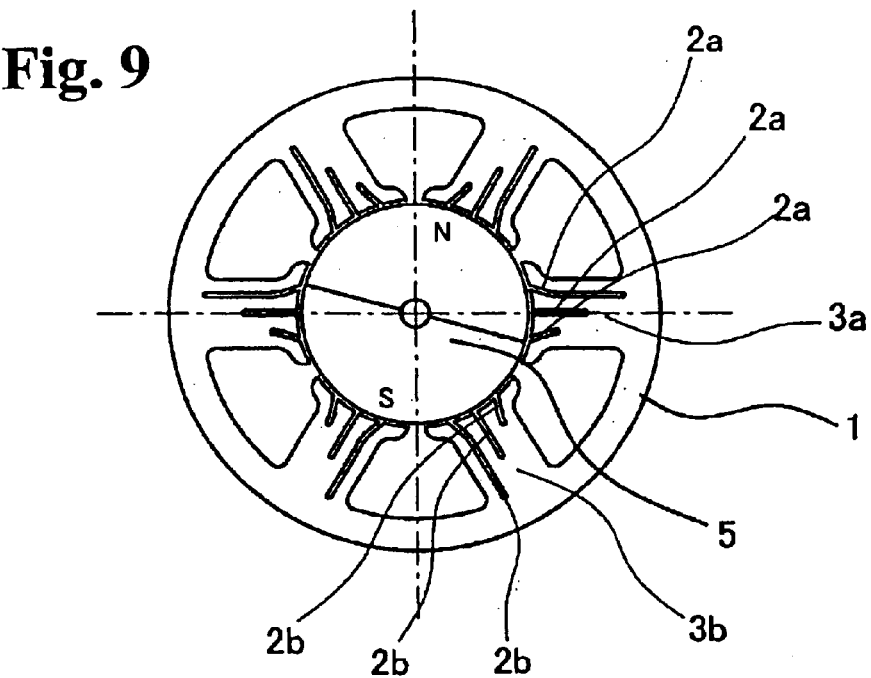
FIG. 9 is a drawing showing an embodiment including an iron core formed of six magnetic pole pieces and a rotor with two poles.

FIG. 9 shows an embodiment including a stator iron core 1 having six magnetic pole pieces in total, and a rotor 5 with two poles according to the present invention. When compared with a conventional iron core, since the slits 2a and 2b are provided to the magnetic pole pieces 3a and 3b, respectively, in a symmetrical shape, the attracting forces acting on the rotor 5 and the magnetic pole piece become small, and further, actions for negating the mutual attracting forces between the magnetic pole pieces 3a and 3b are generated, resulting in further reduced cogging torque.

Figure 10:
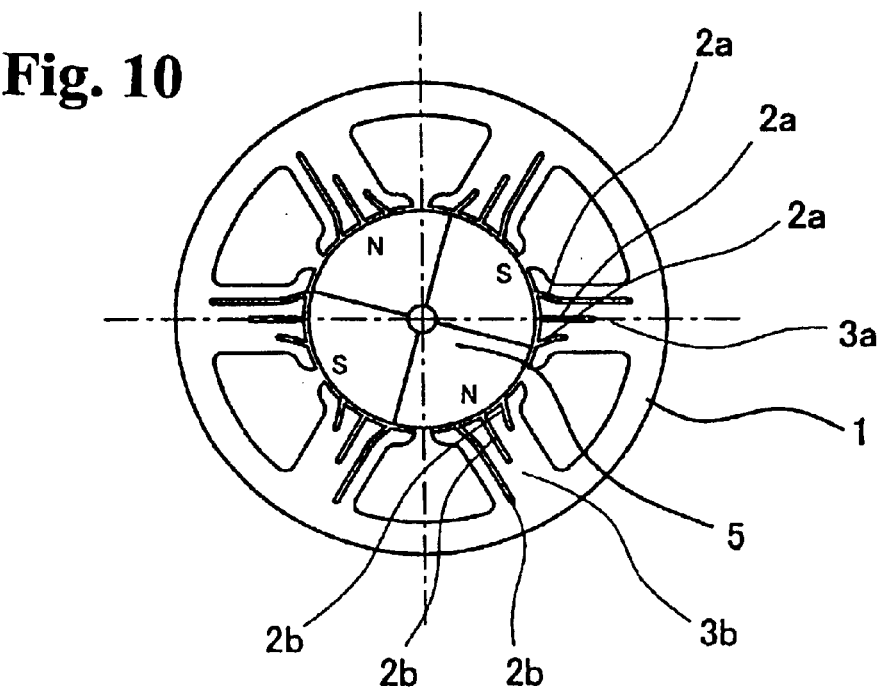
FIG. 10 is a drawing showing an embodiment including an iron core formed of six magnetic pole pieces and a rotor with four poles.

FIG. 10 shows an embodiment including a stator iron core 1 having six magnetic pole pieces in total, and a rotor 5 with four poles according to the present invention. When compared with a conventional iron core, since the slits 2a and 2b are provided to the magnetic pole pieces 3a and 3b, respectively, in a symmetrical shape, the attracting forces acting on the rotor 5 and the magnetic pole piece become small, and further, actions for negating the mutual attracting forces between the magnetic pole pieces 3a and 3b are generated, resulting in further reduced cogging torque.

FIGS. 9 and 10 are schematic views showing embodiments of brushless motors. However, according to the present invention, the cogging torque can also be reduced in various other combinations of the pole number and various other rotating instruments.

Figure 11:
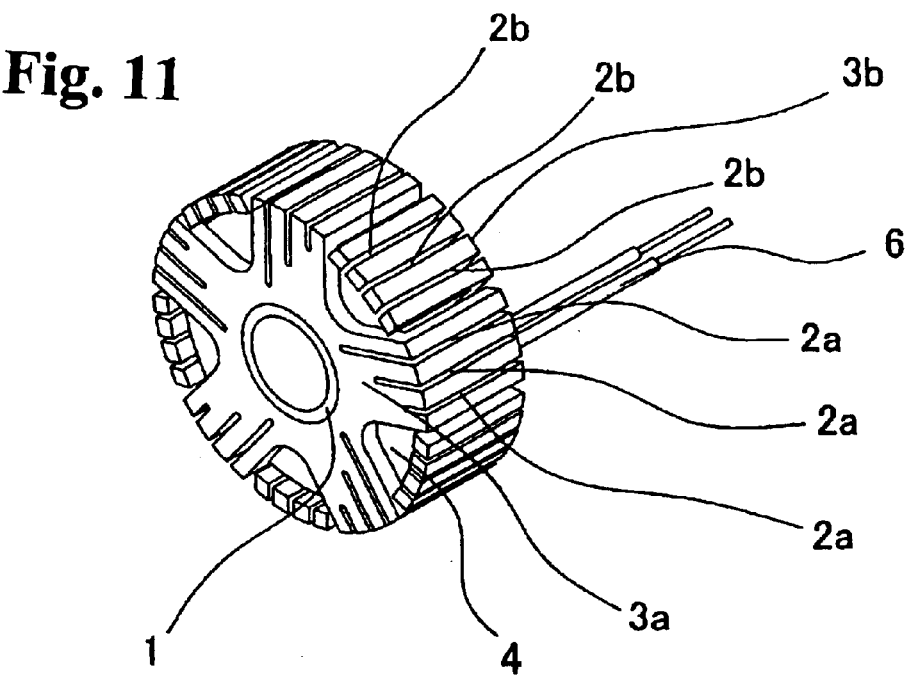
FIG. 11 is a perspective view showing an embodiment including a stator iron core formed of straight groove type magnetic pole pieces with ten claw poles according to the present invention.

FIG. 11 is a perspective view showing an example of a stator iron core embodying an iron core (outer rotor) with ten claw-pole type straight groove magnetic pole pieces according to the present invention.

Figure 12:
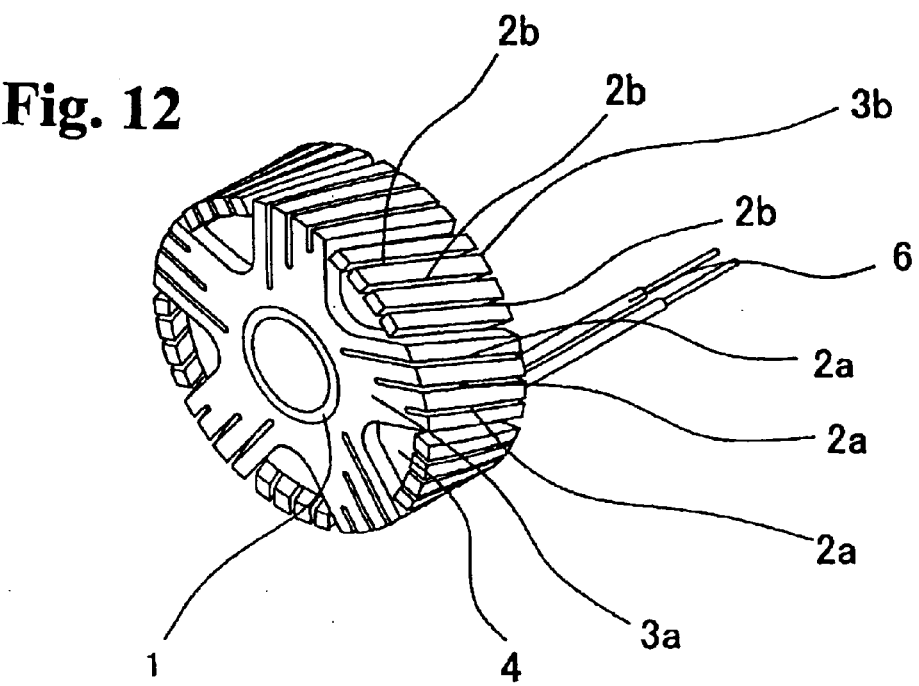
FIG. 12 is a perspective view showing an embodiment including a stator iron core formed of slant groove type magnetic pole pieces with ten claw poles according to the present invention.

FIG. 12 is a perspective view showing an example of a stator iron core embodying an iron core (outer rotor) with ten claw-pole type slant groove magnetic pole pieces according to the present invention.

Figure 13:
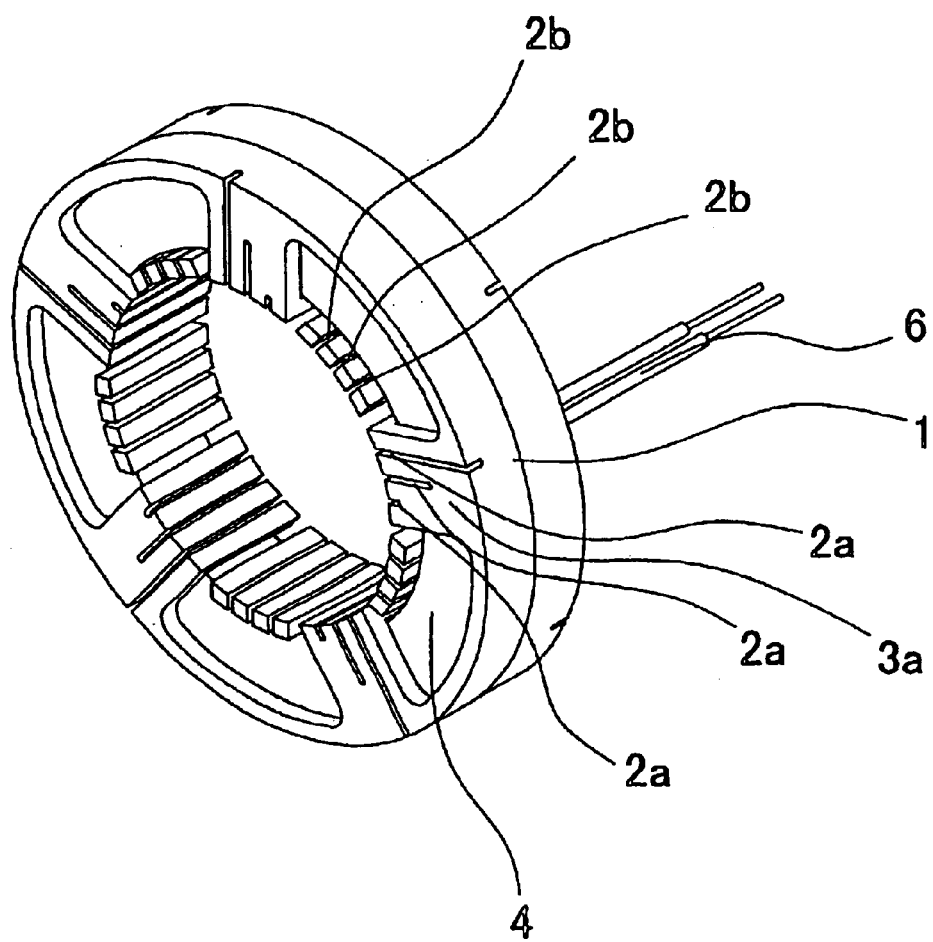
FIG. 13 is a perspective view showing an embodiment including a stator iron core (inner rotor) formed of straight groove type magnetic pole pieces with ten claw poles according to the present invention.

FIG. 13 is a perspective view showing an example of a stator iron core embodying an iron core (inner rotor) with ten claw-pole type straight groove magnetic pole pieces according to the present invention.

Figure 14:
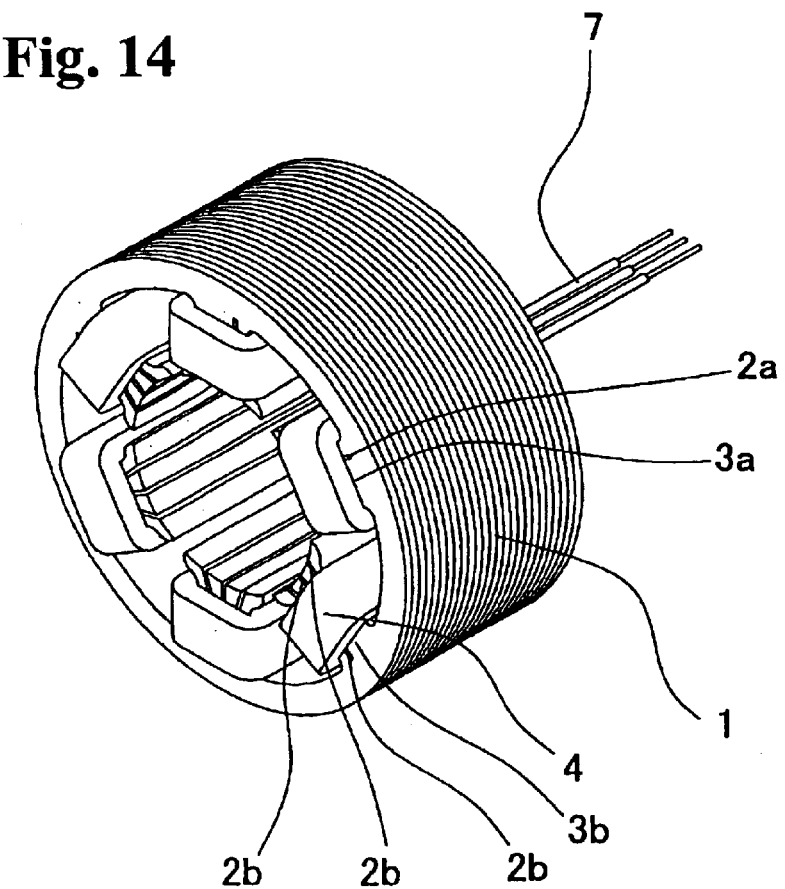
FIG. 14 is a perspective view showing an embodiment including a stator iron core (inner rotor) of three-phase type straight groove magnetic pole pieces with six poles according to the present invention.

FIG. 14 is a perspective view showing an example of a stator iron core embodying an iron core (inner rotor) of 3 phase straight groove type magnetic pole pieces with six poles according to the present invention.

As described hereinabove, the iron cores according to the invention are entirely new.

In the prior art, in an electric motor or an electric generator having the same pole number, for example, 6-pole stator, 6-pole rotor and the like, it has been difficult to make the same since a strong cogging torque is structurally generated. However, according to the above-described structures of the present invention, as has been described in detail about one embodiment having the 6-pole stator and the 6-pole rotor, the cogging torque can be reduced, and even in case the number of the stator poles and the number of the rotor poles are the same, it is possible to produce the electric motor or the electric generator.

Also, in the prior art, it has been difficult to reduce the cogging torque in case the pole number is small, such as 3-pole stator and 2-pole rotor. However, according to the present invention, the cogging torque can be reduced, even in case the pole number is small, to thereby make it possible to produce the pole number in the electric motor or the electric generator.

Further, in the stator formed of the claw pole type iron core, even if the total number of magnetic poles becomes large, the stator can be easily produced, so that the rotating instrument having a single phase, three phases, or more phases can be easily produced.

As described in detail hereinabove, the present invention is a technique for reducing the cogging torque of the rotating instruments; obtaining excellent rotating characteristics; realizing rotating instruments for the electric motor or electric generator having high efficiency and high power; and, further, providing the rotating instruments having high performance at a low cost.

While the invention has been explained with reference to the specific embodiments of the invention, the explanation is illustrative and the invention is limited only by the appended claims.

What is claimed is:

1. An iron core for an electric motor or an electric generator, comprising:
   a core section, and
   at least two magnetic pole pieces formed at the core section, each magnetic pole piece having a surface symmetric with respect to a center line thereof, and at least two slits extending from the surface and having different depths asymmetric with respect to the center line thereof to divide the magnetic pole surface to thereby reduce a cogging torque of a rotor.

2. An iron core according to claim 1, wherein said magnetic pole pieces are arranged around a central axis of the core section, said center line being located on a radial line extending radially outwardly from a center of the core section.

3. An iron core according to claim 2, wherein each magnetic pole piece further includes a center slit having a depth between the at least two slits and located in the radial line.

4. An iron core according to claim 3, wherein said at least two magnetic pole pieces extend radially inwardly from the core section.

5. An iron core according to claim 3, wherein said core section is formed of two core portions assembled together, each core portion having said at least two magnetic pole pieces extending radially outwardly from the core portion to form a claw so that the at least two magnetic pole pieces of the two core portions are arranged alternately in a circumference direction.

6. An iron core according to claim 3, wherein said at least two magnetic pole pieces include first and second groups formed of a same number of the magnetic pole pieces, each of said magnetic pole pieces forming said first group having said at least two slits with difference depths and each of said magnetic pole pieces forming said second group having said at least two slit with different depth, said magnetic pole pieces of the first and second groups being arranged alternately such that the slits of one magnetic pole piece is arranged symmetrically to the slits of one magnetic pile piece adjacent thereto.

7. An iron core according to claim 1, wherein said at least two slits with different depth are arranged in each magnetic pole piece symmetrically with respect to the center line to form magnetic lines in each magnetic pole piece with different lengths.

* * * * *